June 12, 1934.  W. BARBER  1,962,118
AUTOMOBILE CONSTRUCTION
Filed Nov. 16, 1928  4 Sheets-Sheet 1

Inventor
William Barber

June 12, 1934.  W. BARBER  1,962,118
AUTOMOBILE CONSTRUCTION
Filed Nov. 16, 1928  4 Sheets-Sheet 2
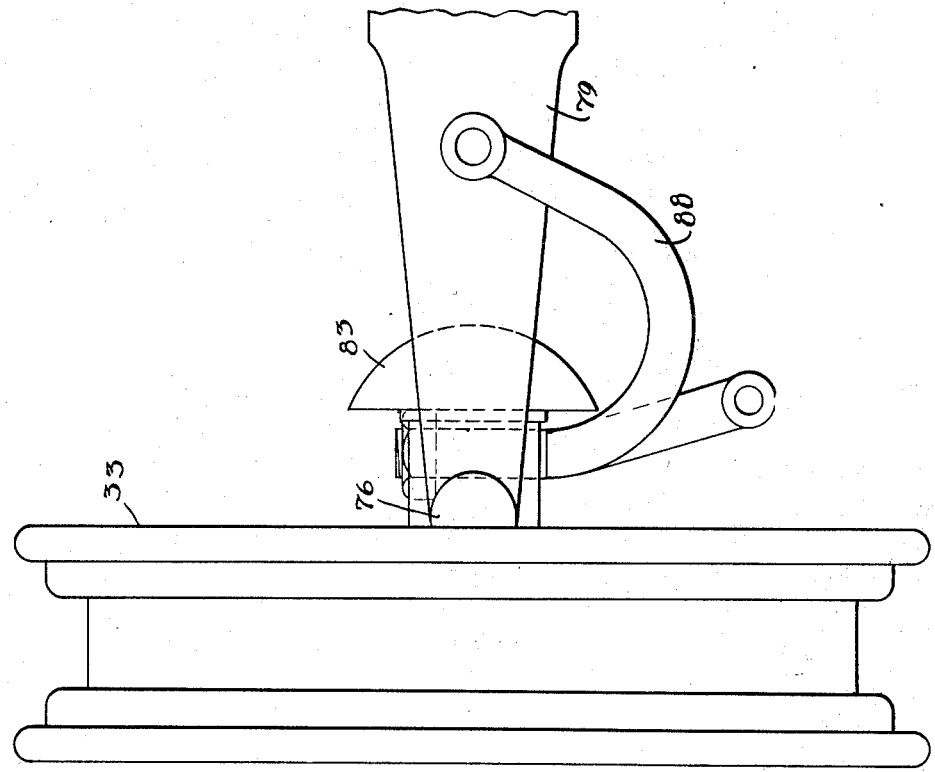
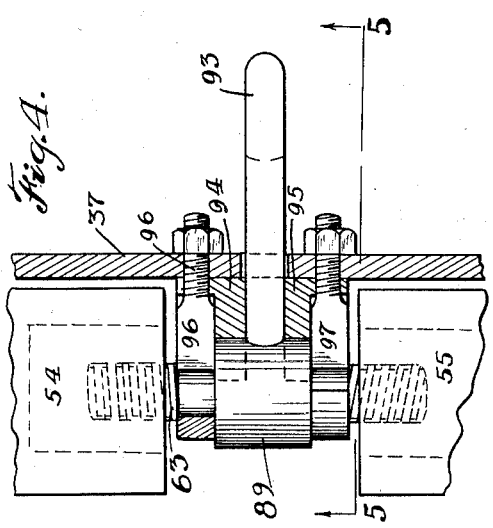
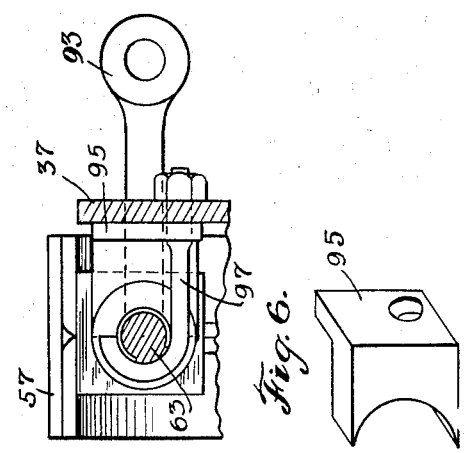
Inventor
William Barker

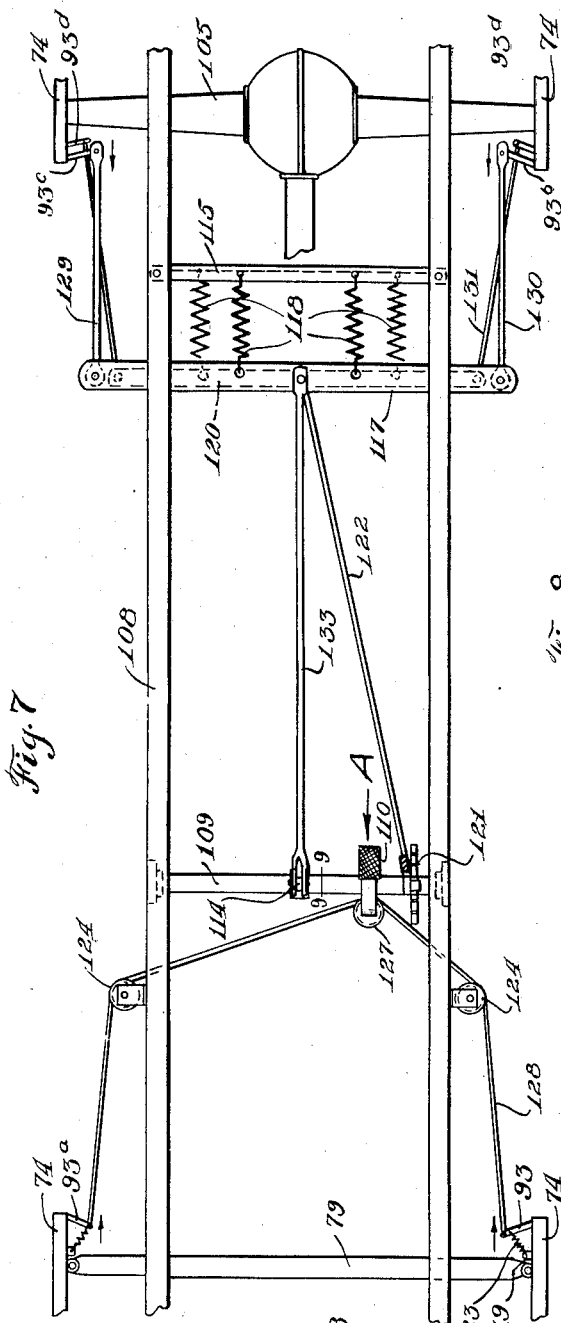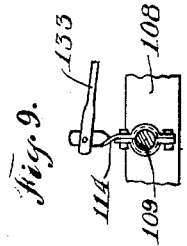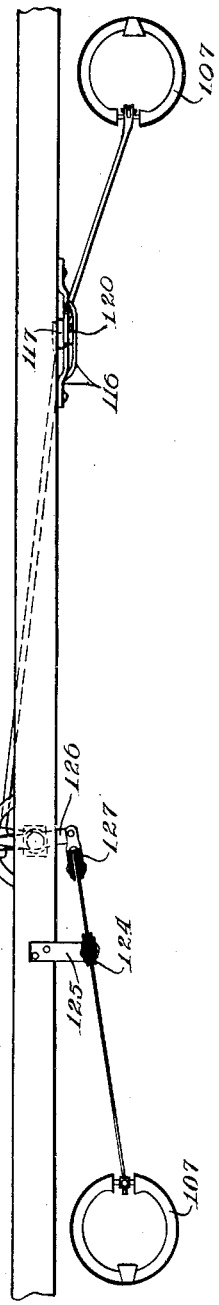

June 12, 1934. W. BARBER 1,962,118
AUTOMOBILE CONSTRUCTION
Filed Nov. 16, 1928 4 Sheets-Sheet 4
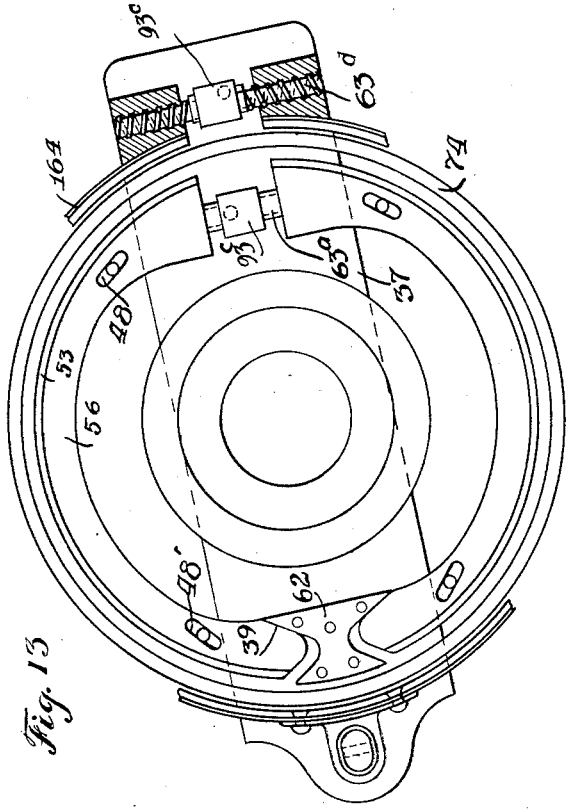
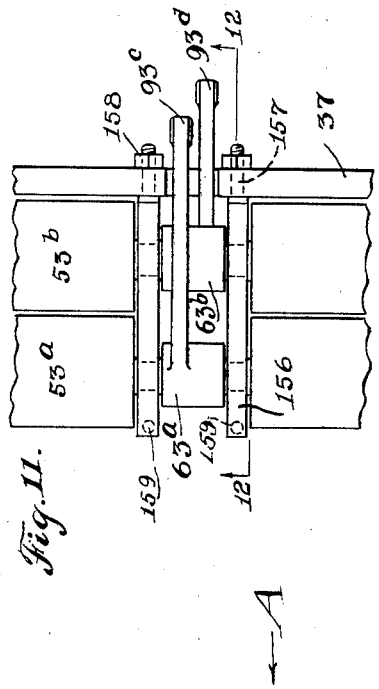
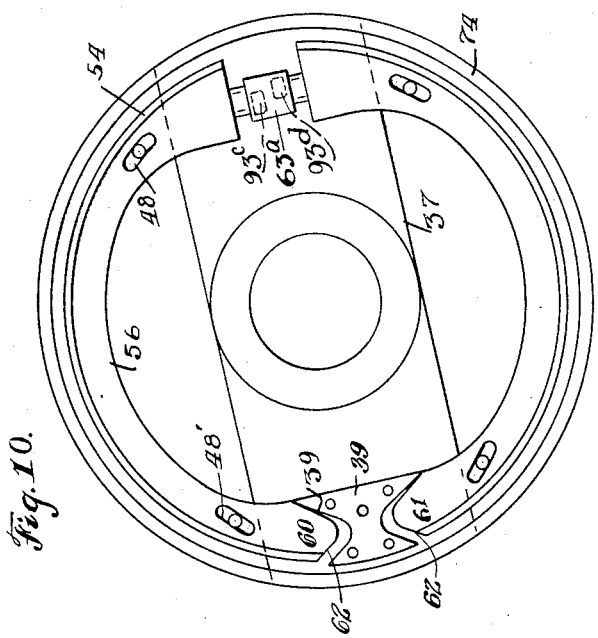
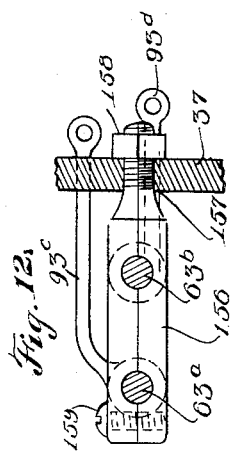
Inventor
William Barber Patented June 12, 1934

1,962,118

UNITED STATES PATENT OFFICE 1,962,118

AUTOMOBILE CONSTRUCTION

William Barber, Brooklyn, N. Y.

Application November 16, 1928, Serial No. 319,826

9 Claims. (Cl. 188—194)

My present invention relates to an improvement in motor vehicles and has to do more particularly with the brake mechanisms and also with the steering wheels of the car.

The principal object of my invention is to provide an improved construction for the brake mechanisms for motor vehicles so that a few parts are necessary and a very slight touch of the pedal will have the necessary effect upon the brakes.

Another object of my invention is to provide simple effective means for supporting the brake mechanisms in a steering wheel construction so that the brake mechanisms may partake of the swiveling movement of the wheel.

Another object of my invention is to provide a brake-drum that acts as a tire-carrying means.

A further object of this invention is to provide means for connecting the steering arm with the steering wheels equipped with brakes.

A still further object of my invention is to provide a front brake mechanism wherein it does not require universal joints or any other extra contrivances.

A still further object of this invention is to provide a front wheel mechanism where the hub stays still and the axle rotates.

A still further object of this invention is to provide a brake shoe that is interchangeable with the rear or front, right or left wheels or, interchangeable in any manner without requiring any modification.

A still further object of this invention is to provide steering mechanisms where the brake structure is carried on the hub.

A still further object of my invention is to provide a steering mechanism wherein it will prevent the front wheels from shimmying.

Other objects of the invention will be apparent from the following detailed description of the accompanying drawings, illustrating a preferred embodiment, in which Figure 1 is a vertical sectional view of front wheel.

Figure 3 is a top plan view of wheel and steering mechanism.

Figure 4 is a fragmentary detail view of braking mechanism.

Figure 5 is a view taken on line 5—5 of Figure 4.

Figure 6 is a perspective view of hook-block.

Figure 7 is a diagrammatic view of top plan showing layout for four-wheel brake.

Figure 8 is a side elevational view of Figure 7.

Figure 9 is a view taken on line 9—9 of Figure 7.

Figure 10 is a side elevational view of drum having double brake bands.

Figure 11 is a fragmentary view of Figure 10 looking in direction of arrow A.

Figure 12 is a sectional view taken on line 12—12 of Figure 11.

Figure 13 is a side elevational view of brake drum having internal and external braking elements.

Figure 2:
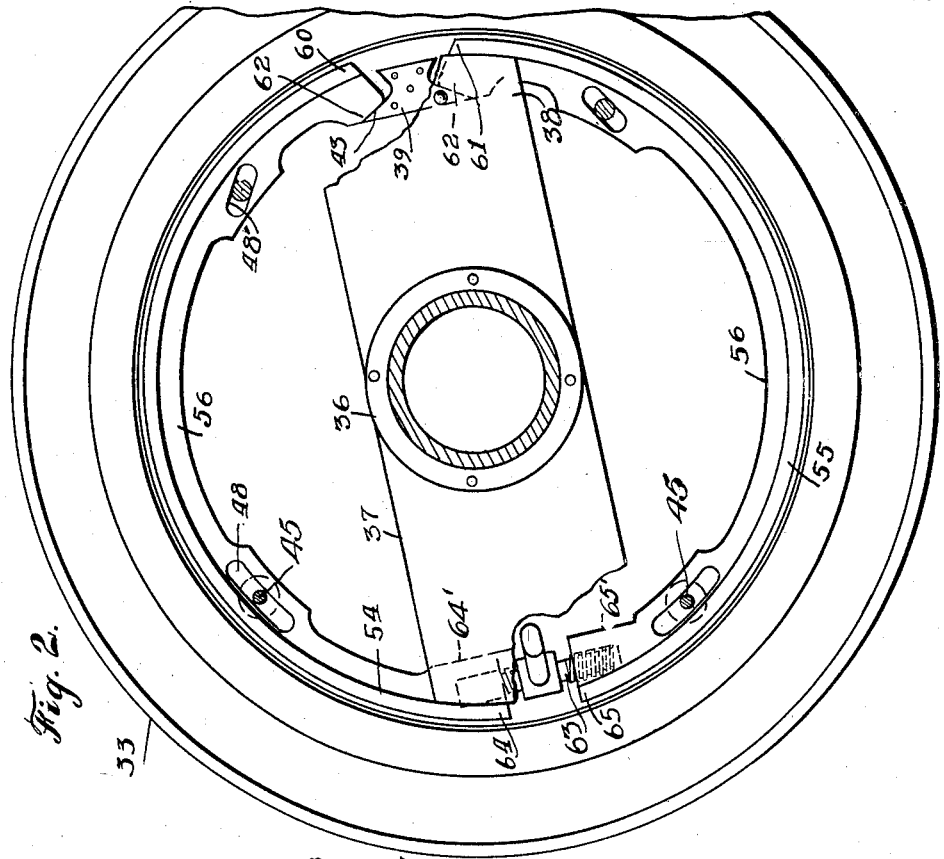
Figure 2 is a fragmentary side elevation of wheel with parts removed.
Figure 1:
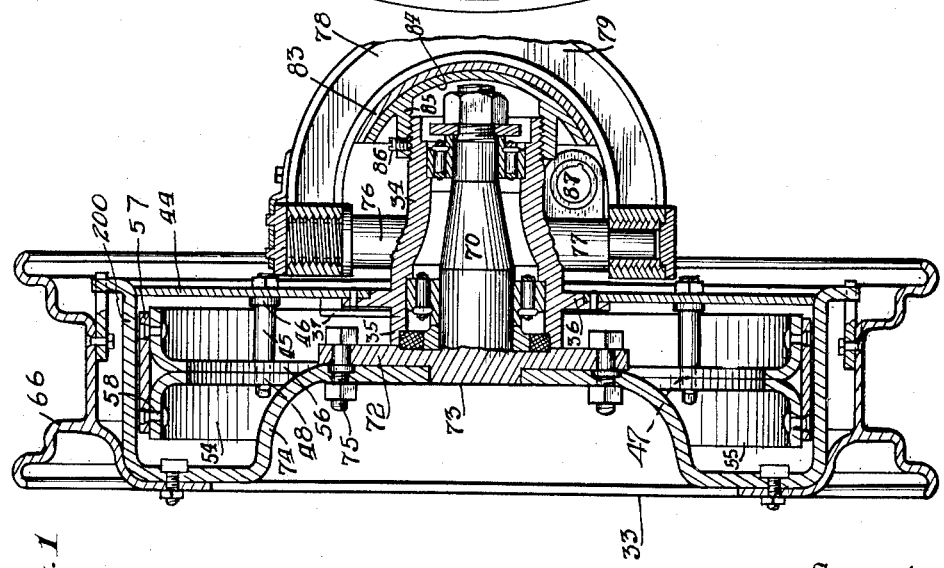

The brake mechanism of the present invention is employed in the present instance, in connection with front wheels 33 having a stationary hub portion 34. Said hub portion is provided, adjacent its outer end 35, with an annular flange 36. To the flange 36 is fixed the brake-beam 37. To the end 38 of brake beam is riveted a guide member 39 having angularly disposed surfaces 43. To the flange 36, and on the side opposite that to which the brake beam is fixed, is secured, by means of bolts, screws, or the like, the dust pan 44 having riveted thereto the studs 45. Stud 45 is provided with a shoulder 46 and a reduced portion 47; the reduced portion passing through an elongated aperture 48 of the rib portions 56, of brake shoe 53. The above mentioned brake shoe, in the present instance, consists of two sections 54 and 55, each section consisting of two segments of angle irons which are welded together in such manner that their inturned angles form a single rib 56 and their right-angular positions the periphery, to which is secured a shoe lining 57 by means of rivets 58. At the ends 60 and 61 of each rib 56 is formed a wedge 62, the face of which coacts with angular face of guide 39 to bring the brake shoe linings into frictional engagement with the inner periphery of the brake drum 200, when the worm gear 63 is brought into operation. This worm gear 63 is interposed between the substantially parallel faces of the ends 64 and 65 of segments 54 and 55 of the brake shoes and is in threaded engagement with lugs 64' and 65' which are either welded or riveted to the respective opposed ends of the brake shoes. The elongated aperture 48' is inclined in such manner that when angular face 62 slides over guide 39 there is no undue friction against stud 45. When brake shoe is released the angularly disposed sides of aperture 48' guide brake shoe away from brake drum 200 with no possibility of sticking.

Within the hub 34 is mounted, for rotation, the inwardly projecting stub axle 70; from the outward end of said axle extends the angular flange 72 having the offset portion 73 and supporting the brake drum 200 and tire carrying portion 74; said members being held in position through the instrumentality of bolts 75.

Substantially midway between ends of hub 34, and on opposite sides, extend vertically therefrom the steering pivot members 76 and 77 respectively. To said steering pivots is pivoted the bifurcated end 78 of the fixed axle 79. Between the branches of the bifurcated axle is formed a ball socket 83 with a radius equal to the distance between its inner face and the vertical axis of steering pivot. Within the socket 83 operates the male member 84, the outer surface of which conforms to that of the inner surface of the ball socket 83. A portion of inner surface of member 84 is formed into an internally screw-threaded cap 85, through the threaded portion of said cap extends the set-screw 86. The ball socket together with its coacting parts prevent the wheel from "shimmying." The wear between the members of the joint is taken care of by means of adjustment of threaded cap. At 87 is shown steering arm aperture, 88 is the steering arm.

In Figures 4, 5 and 6 are shown in detail the parts of the worm gear 63, and other connecting parts.

In Figure 4 is an elevational view of worm gear 63 having a body portion 89, actuating arm 93, spacing blocks 94 and 95, and hook bolts 96 and 97.

Figure 5 is a view looking into the end of worm 63 and lug 98, said lug being permanently secured to inner face of brake shoe.

Figure 6 is a perspective view of securing block 95.

In Figures 7 and 8, I have shown the hook-up of my four-wheel brake arrangement in which 79 is the front axle and 105 rear axle, having brake drum 74. To the frame 108 is pivotally connected the cross bar 109 to which is fixed the foot pedal 110 and the arm 114. Hand lever 121 is also carried by said cross bar.

Between the frame members toward the rear, is the supporting member 115. To the under side of frame, and in spaced relation with supporting member 115 is slidably positioned between frame member 108 and brackets 116, the foot brake bar 117, having tension springs 118 extending therefrom and engaging supporting member 115. Positioned beneath foot brake bar 117 is a hand brake bar 120, connecting with hand brake lever 121 through the instrumentality of link 122. To the ends of brake bar 120 is further provided the link 131 which connects with actuating arm 93$^d$.

To the hub 34 is fixed an apertured ear 119 to which fastens one end of spring 123, the opposite end being fastened to actuating arm 93.

To the sides of frame 108 are secured pulleys 124 by means of brackets 125. From the lower end of foot pedal extends the extension 126 having connected thereto the pulley 127. A cable 128 passes over pulleys 127 and 124 and its ends connect with the free end of actuating arms 93 and 93$^a$.

To the ends of the actuating arms 93$^b$ and 93$^c$ are pivotally secured the connecting links 129 and 130, said connecting links being pinned to the ends of brake bar 117, and said brake bar is joined to arm 114 by the link 133.

It will be apparent from the drawings that when the pedal moves in the direction indicated by the arrow A that all actuating arms will move in the directions indicated by their respective arrows, and in so doing operate the brakes in the desired manner.

In Figures 10, 11 and 12 I have shown my improved device as applied to brake drums having double internal brake shoes 53$^a$ and 53$^b$, each of which is provided with worm gears 63$^a$ and 63$^b$. To the gears 63$^a$ and 63$^b$ are secured the actuating arms 93$^c$ and 93$^d$. The gears are held in position by means of a split-bolt 156 one end of which passes through aperture 157 of brake beam 37 and is secured thereto by nut 158; the opposite ends of said split-bolt are secured together by machine screw 159.

In Figure 13, I have shown my device as applied to a drum having an internal brake shoe 53 and external brake band 164. The operation of this mechanism is substantially the same as above described.

Having thus described my invention, what I claim as new and wish to protect by Letters Patent, is:

1. In a brake mechanism, a front wheel axle having forked members, a hub mounted thereon, said hub having a swivel joint for engagement with the forked members, a stub axle and a brake drum united therewith to rotate with said axle, and a hub cap bearing in said forked members.

2. In a brake mechanism of the type described, a brake drum, a plurality of slotted braking elements adapted to coact with said drum, each of said braking elements having one end thereof free and of predetermined shape and the other end thereof formed to receive a lug, a guiding element having operative faces of predetermined shape to guide the free ends of said braking elements and means operatively joining the lugs on each of said braking elements for effecting simultaneous frictional engagement and disengagement of said elements with the brake drum.

3. In a brake mechanism, a brake drum, a plurality of opposed braking elements conformed to said drum and having a set of opposed corresponding free and guidable ends and a set of opposed corresponding operating ends, means for guiding said guidable ends, means operatively connecting said operating ends to actuate the braking elements, and means for guiding the bodies of said elements, when actuated, as units into and out of contact with the brake drum to effect simultaneous engagement or disengagement between said drum and said elements over the whole of the operative surface of said elements.

4. In a brake mechanism, a brake drum, a brake beam, a predeterminately shaped guide member secured to said brake beam, a pair of braking elements conformed to said drum and having an integral rib thereon provided with a plurality of slots therein, means in said slots for guiding the braking elements into and out of contact with the brake drum, said braking elements each having a free and guidable end and an end adapted to receive a threaded lug, and a worm member operatively joining said elements at the threaded lugs.

5. In a brake mechanism a brake drum, a plurality of individual brake shoes conformed to said drum, means for guiding said shoes, and operative means joining said shoes at opposed adjacent ends thereof for effecting the simultaneous application thereof to said drum over the whole of the contact surface of the shoes.

6. In a brake mechanism of the type described, the combination with a fixed hub of a brake beam, a pivoted knuckle, an associated wheel axle, a stub axle, a brake drum rotatably mounted on said stub axle, a plurality of braking elements contacting with said brake drum internally thereof, a worm member having its actuating ends threaded into the substantially parallel faces of the opposed ends of said braking elements, and a brake lever and actuating members for actuating said worm member and braking elements.

7. In a brake mechanism of the type described, the combination with a fixed hub, a brake beam, a steering arm, a pivoted knuckle, an associated wheel axle, a stub axle, a drum rotatably mounted on said stub axle, a plurality of braking elements coacting with said drum and having substantially parallel faces at opposed ends thereof, a worm member having its actuating ends threaded into said parallel faces, a brake lever and actuating members for actuating said worm member and said braking elements, and a wedging means anchored to the brake beam and coacting with inclined portions on the free ends of the brake elements to guide said elements into frictional engagement with the brake drum.

8. In a brake mechanism of the type described the combination with a fixed hub, of a brake beam, a steering arm, a pivoted knuckle, an associated wheel axle, a stub axle, a drum rotatably mounted to said stub axle, a worm member, braking elements coacting with said drum and adapted to be actuated by movement of said worm member, a brake lever and actuating members, a wedging member anchored to the brake beam and coacting with inclined portions at the free ends of said braking elements to guide them into frictional engagement with said brake drum, a rib formed on said braking elements at substantially right angles thereto, said rib having elongated openings therein through which supporting means extend.

9. In a motor vehicle the combination of a non-rotatable hub, a brake drum, a stub axle mounted within said stationary hub to revolve in combination with said brake drum, a brake mechanism coacting with said brake drum and mounted to swivel with said stub axle and hub, and a cable connected to actuate said brake mechanism, said cable being connected to the brake mechanism of the front wheels.

WILLIAM BARBER.